United States Patent
Atwi et al.

(10) Patent No.: US 11,801,640 B2
(45) Date of Patent: Oct. 31, 2023

(54) ADDITIVE MANUFACTURING POST-PROCESSING SYSTEM

(71) Applicant: Ford Motor Company, Dearborn, MI (US)

(72) Inventors: Hadi Atwi, Dearborn, MI (US); Richard Moore, Fenton, MI (US)

(73) Assignee: Ford Motor Company, Dearborn, MI (US)

( * ) Notice: Subject to any disclaimer, the term of this patent is extended or adjusted under 35 U.S.C. 154(b) by 11 days.

(21) Appl. No.: 17/552,583

(22) Filed: Dec. 16, 2021

(65) Prior Publication Data
US 2023/0191703 A1 Jun. 22, 2023

(51) Int. Cl.
| | |
|---|---|
| *B29C 64/379* | (2017.01) |
| *B29C 64/245* | (2017.01) |
| *B29C 64/227* | (2017.01) |
| *B29C 64/35* | (2017.01) |
| *B33Y 30/00* | (2015.01) |
| *B33Y 40/20* | (2020.01) |
| *B33Y 50/02* | (2015.01) |
| *B29C 64/393* | (2017.01) |

(Continued)

(52) U.S. Cl.
CPC .......... *B29C 64/379* (2017.08); *B29C 64/227* (2017.08); *B29C 64/245* (2017.08); *B29C 64/35* (2017.08); *B29C 64/393* (2017.08); *B33Y 30/00* (2014.12); *B33Y 40/20* (2020.01); *B33Y 50/02* (2014.12); *B29C 64/386* (2017.08); *B33Y 50/00* (2014.12)

(58) Field of Classification Search
CPC ... B29C 64/379; B29C 64/245; B29C 64/386; B29C 64/393; B29C 64/227; B29C 64/35; B33Y 30/00; B33Y 40/20; B33Y 50/00; B33Y 50/02

USPC .......................................................... 425/427
See application file for complete search history.

(56) References Cited

U.S. PATENT DOCUMENTS

| | | | |
|---|---|---|---|
| 2019/0291184 A1 | 9/2019 | Buller et al. | |
| 2020/0070421 A1* | 3/2020 | Horn | B33Y 30/00 |
| 2022/0134657 A1* | 5/2022 | Schmidt | B29C 64/255 |
| | | | 264/401 |

FOREIGN PATENT DOCUMENTS

| | | | |
|---|---|---|---|
| CN | 112549539 | 3/2021 | |
| CN | 112549539 A * | 3/2021 | B29C 64/112 |

(Continued)

OTHER PUBLICATIONS

Huang et al., CN112549539A Machine translation to English, Mar. 26, 2021 (Year: 2021).*

*Primary Examiner* — Joseph S Del Sole
*Assistant Examiner* — Lawrence D. Hohenbrink, Jr.
(74) *Attorney, Agent, or Firm* — Burris Law, PLLC

(57) ABSTRACT

A post-processing system includes a rinse tank, a robot arm, a locking fixture, and a controller. The robot arm is configured to engage and move a workpiece. The locking fixture includes a platform support structure and a clamping assembly. The controller is in communication with the robot arm and the platform locking fixture. The controller is configured to instruct the robot arm to move the workpiece from a workstation to the rinse tank, instruct the robot arm to move the workpiece from the rinse tank to the platform support structure, and instruct the clamping assembly to secure the workpiece onto the platform support structure after the workpiece has been moved to the platform support.

20 Claims, 6 Drawing Sheets

(51) Int. Cl.
    *B33Y 50/00*     (2015.01)
    *B29C 64/386*     (2017.01)

(56)     References Cited

FOREIGN PATENT DOCUMENTS

| | | |
|---|---|---|
| EP | 3797970 | 3/2021 |
| WO | 2020174092 | 9/2020 |

\* cited by examiner

ADDITIVE MANUFACTURING POST-PROCESSING SYSTEM

FIELD

The present disclosure relates to an additive manufacturing post-processing system.

BACKGROUND

The statements in this section merely provide background information related to the present disclosure and may not constitute prior art.

Additive manufacturing production systems may include controllers and robots that are configured to sequentially add layers of materials to build three-dimensional (3D) objects, such as tools, consumer electronics, plastics, vehicle components, aerospace components, among other objects. However, additive manufacturing production processes are time consuming and require substantial operator interaction and control to provide objects that are timely, efficiently, and accurately produced. The present disclosure addresses these and other issues associated with additive manufacturing production systems.

SUMMARY

This section provides a general summary of the disclosure and is not a comprehensive disclosure of its full scope or all of its features.

In one form, the present disclosure provides an additive manufacturing post-processing system comprising a rinse tank, at least one robot arm, a platform locking fixture, and a controller. The robot arm is configured to engage and move an automated additive manufacturing production system (AAMPS) workpiece. The platform locking fixture includes a platform support structure and a clamping assembly. The controller is in communication with a workstation, the robot arm and the platform locking fixture and is configured to receive data from the workstation, the robot arm and the platform locking fixture. The controller is configured to (i) instruct the robot arm to move the AAMPS workpiece from the workstation to the rinse tank based on data received, (ii) instruct the robot arm to move the AAMPS workpiece from the rinse tank to the platform support structure based on data received, and (iii) instruct the clamping assembly to secure the AAMPS workpiece onto the platform support structure after the AAMPS workpiece has been moved to the platform support.

In variations of the post-processing system of the above paragraph, which may be implemented individually or in any combination: the rinse tank, the robot arm and the platform locking fixture are secured to a body; the rinse tank further comprises a container, a lid connected to the container and movable between an open position and a closed position, and an actuator, the actuator is connected to the lid and is configured to move the lid between the open position and closed position; the controller is in communication with the actuator and is configured to instruct the actuator to move the lid from the closed position to the open position in response to the AAMPS workpiece being moved from the workstation to the rinse tank; the actuator is a pneumatic cylinder; the clamping assembly of the platform locking fixture comprises a stationary clamp and a movable clamp, the movable clamp movable between a lock position in which the AAMPS workpiece is inhibited from moving and an unlocked position in which the AAMPS workpiece is allowed to move; an actuator connected to the movable clamp and configured to move the movable clamp between the lock position and the unlocked position; the actuator is a pneumatic actuator; the controller is in communication with the actuator and configured to instruct the actuator to move the movable clamp from the unlocked position to the lock position in response to the AAMPS workpiece being moved to the platform support structure; and the rinse tank, the robot arm and the platform locking fixture are adjacent to each other.

In another form, the present disclosure provides an additive manufacturing post-processing system comprising a rinse tank, at least one robot arm, a platform locking fixture, and a controller. The robot arm is configured to engage and move an automated additive manufacturing production system (AAMPS) workpiece. The platform locking fixture includes a platform support structure and a clamping assembly. The controller is in communication with a workstation, the robot arm and the platform locking fixture and is configured to receive data from the workstation, the robot arm and the platform locking fixture. The controller is configured to (i) instruct the robot arm to move the AAMPS workpiece from the workstation to the rinse tank based on data received, (ii) instruct the robot arm to move the AAMPS workpiece from the rinse tank to the platform support structure based on data received, (iii) instruct the clamping assembly to secure the AAMPS workpiece onto the platform support structure after the AAMPS workpiece has been moved to the platform support, and (iv) instruct the robot arm to remove additively manufactured parts from the AAMPS workpiece after the AAMPS workpiece has been secured to the platform support structure.

In variations of the post-processing system of the above paragraph, which may be implemented individually or in any combination: the robot arm comprises a first robot arm configured move the AAMPS workpiece from the workstation to the rinse tank and from the rinse tank to the platform support structure, and a second robot arm configured to remove additively manufactured parts from the AAMPS workpiece; and the rinse tank, the first and second robot arms and the platform locking fixture are secured to a base.

In yet another form, the present disclosure provides an additive manufacturing post-processing system comprising a rinse tank, a first robot arm, a second robot arm, a platform locking fixture, and a controller. The first robot arm is configured to engage and move an automated additive manufacturing production system (AAMPS) workpiece. The second robot arm is configured to engage the AAMPS workpiece. The platform locking fixture includes a platform support structure and a clamping assembly. The controller is in communication with a workstation, the robot arm and the platform locking fixture and is configured to receive data from the workstation, the robot arm and the platform locking fixture. The controller is configured to (i) instruct the first robot arm to move the AAMPS workpiece from the workstation to the rinse tank based on data received, (ii) instruct the first robot arm to move the AAMPS workpiece from the rinse tank to the platform support structure based on data received, (iii) instruct the clamping assembly to secure the AAMPS workpiece onto the platform support structure after the AAMPS workpiece has been moved to the platform support, and (iv) instruct the second robot arm to remove additively manufactured parts from the AAMPS workpiece after the AAMPS workpiece has been secured to the platform support structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1b is a perspective view of a portion of the additive manufacturing post-processing system of FIG. 1a;

FIG. 2 is a perspective view of a rinse tank of the additive manufacturing post-processing system of FIG. 1a;

FIG. 3 is a perspective view of a platform locking fixture of the additive manufacturing post-processing system of FIG. 1a;

Figure 1A:
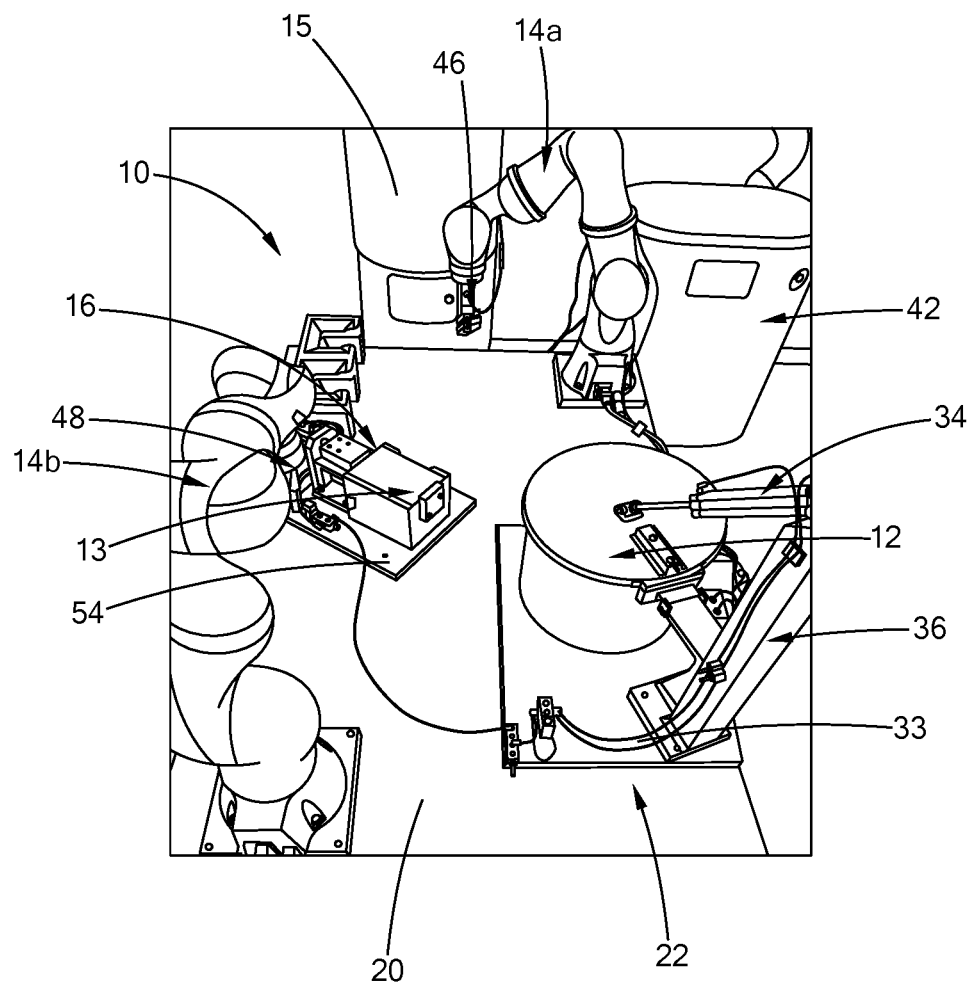
FIG. 1a is a perspective view of an additive manufacturing post-processing system according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
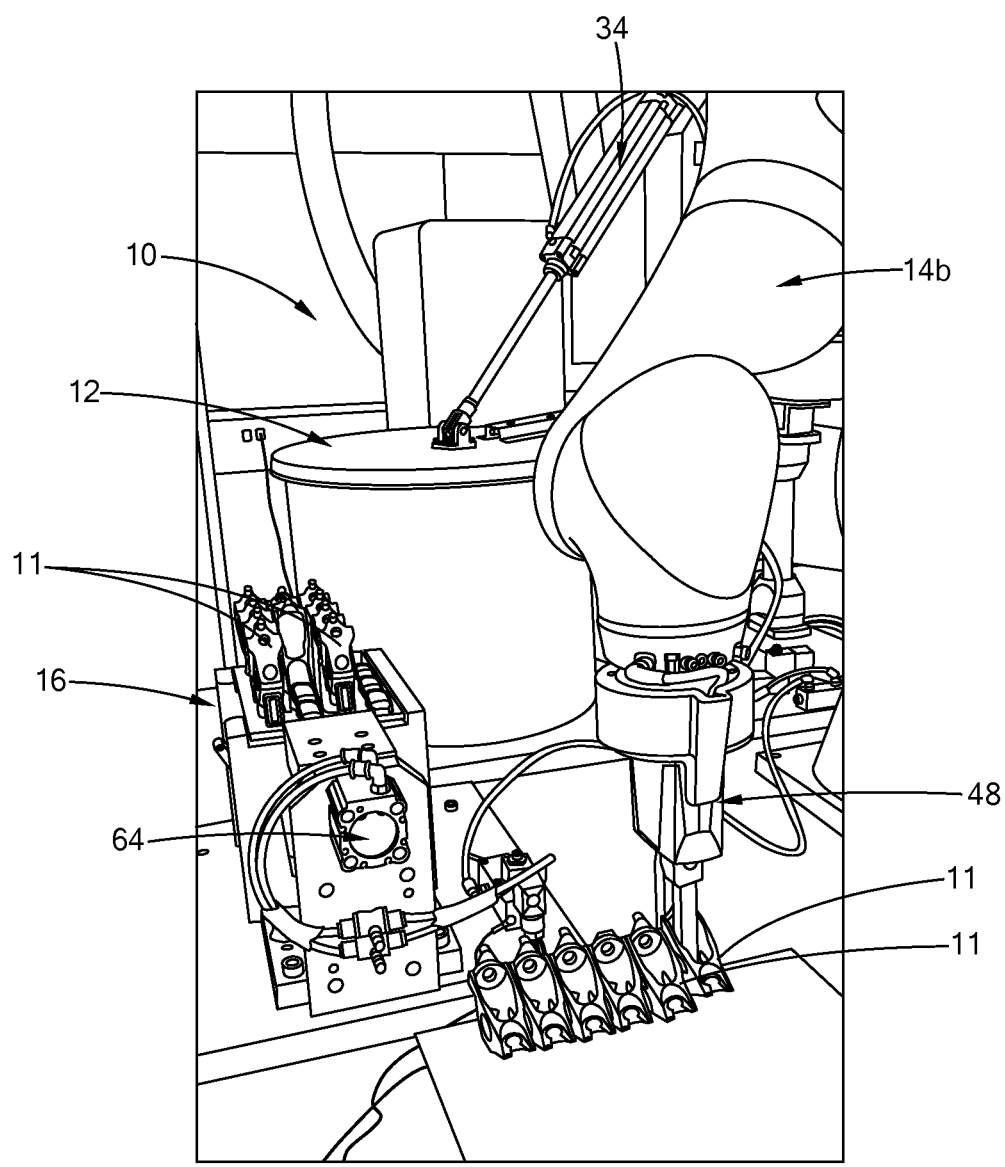

With reference to FIGS. 1a and 1b, an additive manufacturing post-processing system 10 is illustrated. The additive manufacturing post-processing system 10 is configured to further process one or more parts or components 11 produced on an automated additive manufacturing production system (AAMPS) workpiece 13 using an automated additive manufacturing machine 15 (FIG. 1a; i.e., a 3-D printer). In one example, the AAMPS workpiece 13 is a carbon platform. However, the AAMPS workpiece 13 may be other suitable objects in which one or more components may be produced using the 3-D printer.

Figure 4:
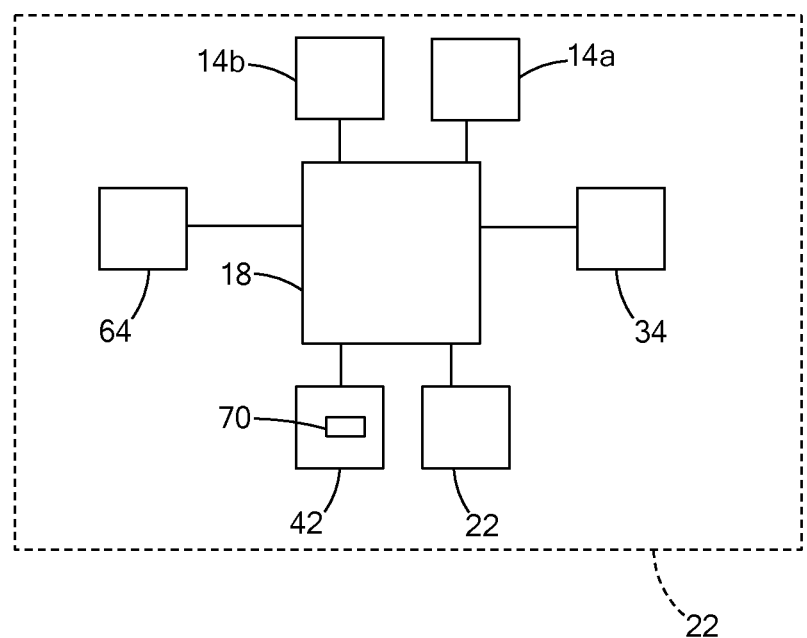
FIG. 4 is a functional block diagram of the additive manufacturing post-processing system in accordance with the present teachings of the present disclosure.

With reference to FIGS. 1a, 1b and 4, the post-processing system 10 includes a rinse tank 12, one or more robot arms 14a, 14a, a platform locking fixture 16, and a robot controller 18 (FIG. 4). In one form, the rinse tank 12, the robot arms 14a, 14b, and the platform locking fixture 16 are disposed on a robot 22 and an equipment mounting base or body 20 secured on the robot 22. In another form, the robot arms 14a, 14b are disposed on the base 20 and/or the robot 22, and the rinse tank 12 and the platform locking fixture 16 are disposed on a separate platform (not shown) adjacent or remote to the robot 22. In such form, the separate platform may be stationary, and the robot 22 is partially or fully autonomous and is configured to autonomously move to the separate platform as instructed by a controller (not shown). To autonomously move itself, the robot controller 18 is configured to control various movement systems of the robot 22 based on location data obtained from one or more sensors. In an example application, the movement systems may include propulsion systems, steering systems for controlling wheels, and/or brake systems, and the sensors for providing location data may include a GNSS sensor, an imaging sensor, a local position sensor, among others.

Figure 2:
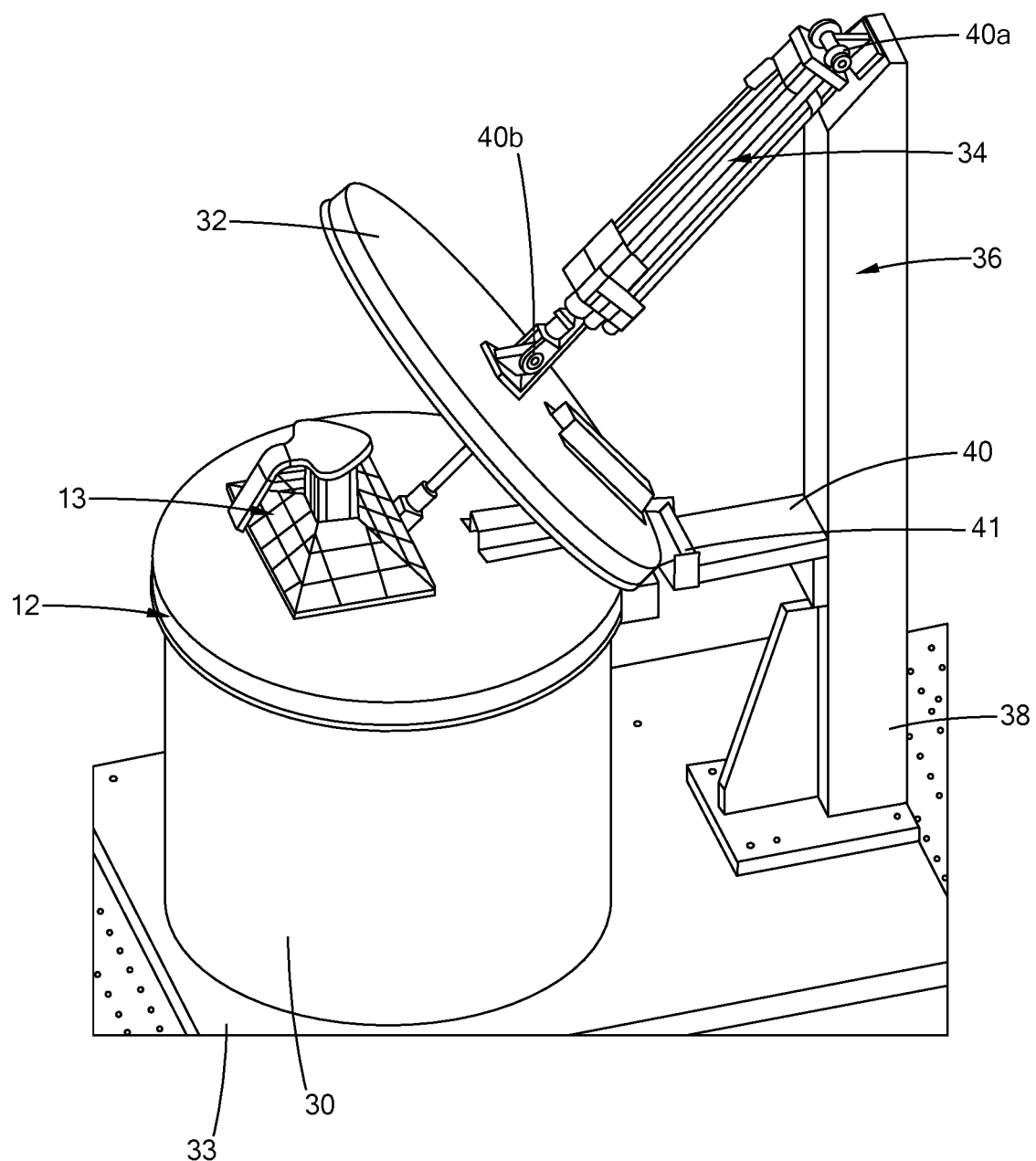

With reference to FIGS. 1a, 1b and 2, the rinse tank 12 includes a container 30 mounted to the robot 22 and the equipment mounting base 20 secured on the robot 22, a lid 32 rotatably secured to the container 30 between an open position and a closed position, and an actuator 34. In the closed position, the lid 32 is sealed with the container 30. In the example illustrated, the container 30 is mounted onto a plate 33 that is, in turn, secured to the base 20 of the robot 22. In other examples, however, the container 30 may be mounted directly to the robot 22. The container 30 is at least partially filled with an alcohol-based solution such as isopropyl alcohol (IPA), for example, to further clean the components 11 after the components 11 have been additively manufactured. The actuator 34 is connected to the lid 32 and is configured to automatically move the lid 32 between the open position and the closed position. That is, the actuator 34 is operable in a first mode in which the lid 32 is in the open position and a second mode in which the lid 32 is in the closed position. In the example illustrated, the actuator 34 is a pneumatic cylinder. In another example, the actuator 34 may be any other suitable actuator that can automatically move the lid 32 between the open and closed positions.

A bracket assembly 36 secures the rinse tank 12 to a predetermined position on the base 20 and includes a support member 38 and a guide member 40. The support member 38 is mounted on the base 20 via the plate 33 and supports the actuator 34. The guide member 40 extends from the support member 38 at or near a middle portion of the support member 38, and supports and guides a pivot point 41 of the rinse tank 12. A first end of the actuator 34 is connected to an upper end of the support member 38 via a cylinder bracket 40a and an opposed second end of the actuator 34 is connected to the lid 32 via a lid bracket 40b. In this way, the actuator 34 is allowed to properly position itself, which inhibits the actuator 34 from binding during operation.

With reference to FIG. 1a, the robot arm 14a is configured to engage and move the AAMPS workpiece 13 from one location to another location. In one example, the robot arm 14a is configured to move the AAMPS workpiece 13 from a workstation or cleaning station 42 (e.g., a wash station such as an air-based washer) to the rinse tank 12, and from the rinse tank 12 to the platform locking fixture 16. The robot arm 14a includes a plurality of segments connected to each other at joints, thereby allowing the robot arm 14a to have multiple degrees of freedom. The robot arm 14a also includes a robotic gripper apparatus 46 configured to grip the AAMPS workpiece 13. One example of such robot arm 14a and gripper apparatus 46 is disclosed in Applicant's co-pending application titled "ROBOTIC GRIPPER APPARATUS" which is commonly owned with the present application and the contents of which are incorporated herein by reference in its entirety.

The robot arm 14b is configured to remove one or more additively manufactured components 11 from the AAMPS workpiece 13. In one example, the robot arm 14b is configured to remove the components 11 from the AAMPS workpiece 13 after the AAMPS workpiece 13 has been secured to the platform locking fixture 16, and place the components 11 onto a plate or platter to be baked and cured. The robot arm 14b includes a plurality of segments connected to each other at joints, thereby allowing the robot arm 14b to have multiple degrees of freedom. The robot arm 14b also includes a robotic gripper apparatus 48 configured to grip and remove the components 11 from the AAMPS workpiece 13. It should be understood that the robotic gripper apparatus 48 may be interchangeable. In this way, another robotic gripper apparatus corresponding to a different set of additively manufactured components can be connected to the robot arm 14b. In some examples, a single robot arm and robotic gripper apparatus may be used to move the AAMPS workpiece 13 from the cleaning station 42 to the rinse tank 12, from the rinse tank 12 to the platform locking fixture 16, and remove the additively manufactured components 11 from the AAMPS workpiece and place the components 11 onto a plate or platter to be baked and cured.

Figure 3:
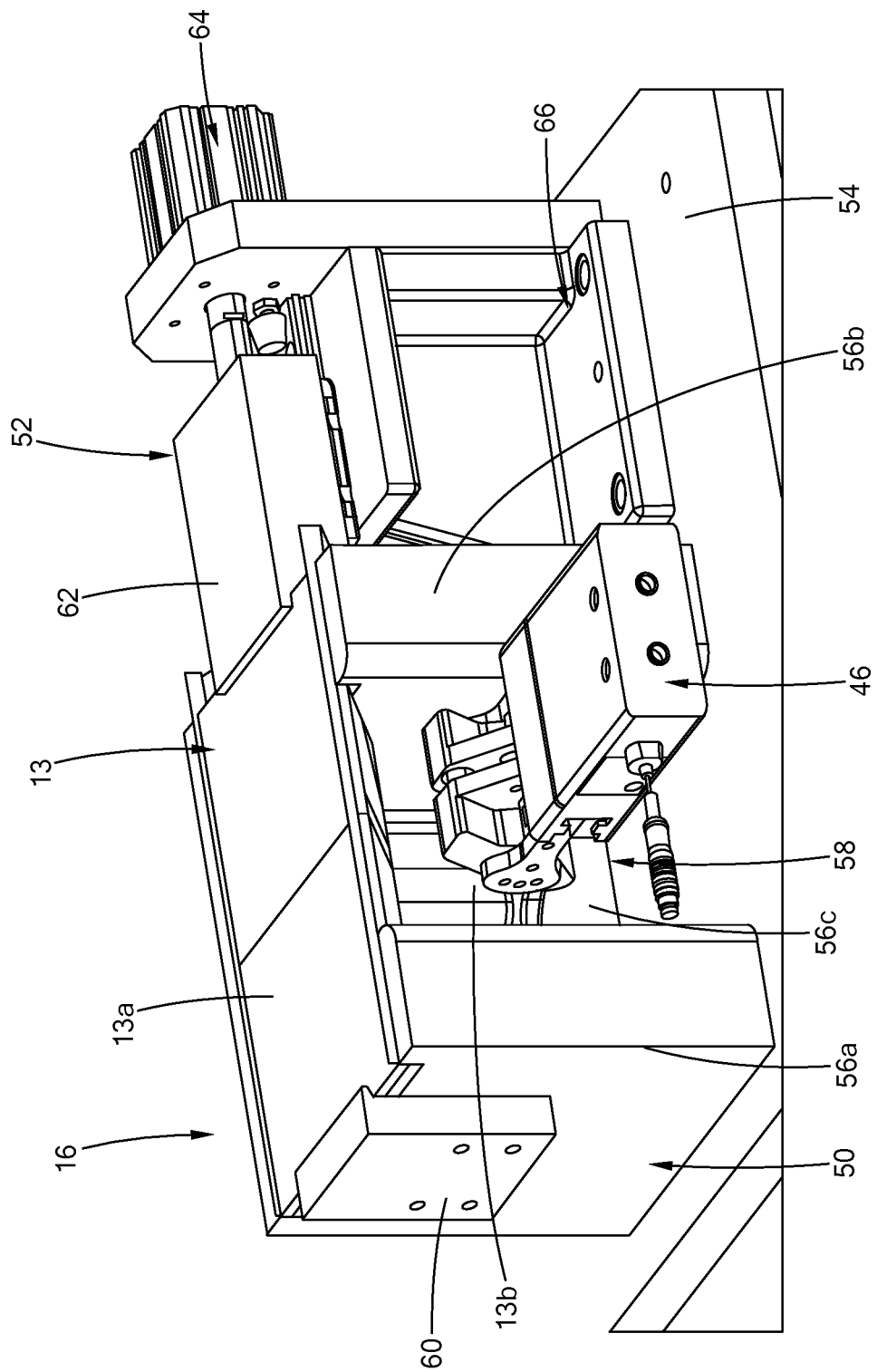

With reference to FIGS. 1a, 1b and 3, the platform locking fixture 16 is configured to secure the AAMPS workpiece 13 so that the components 11 can be removed therefrom using the robot arm 14b. The platform locking fixture 16 includes a platform support structure 50, a clamping assembly 52, and an actuator 64. The platform support structure 50 is mounted on the base 20. In the example illustrated, the platform support structure 50 is mounted onto a plate 54 that is, in turn, secured to the base 20. In other examples, however, the platform support structure 50 may be mounted directly to the base 20. The platform support structure 50 includes opposed legs 56a, 56b and a back wall 56c interconnecting the legs 56a, 56b. A recess is formed at upper ends of each leg 56a, 56b and is configured to receive a workpiece portion 13a of the AAMPS workpiece 13 (i.e., the additively manufactured components 11 are formed on the AAMPS workpiece portion 13a). In this way, the AAMPS workpiece 13 is inhibited from moving in a lateral direction (i.e., direction perpendicular to a longitudinal direction of the platform support structure 50). It should be understood that the handle portion 13b of the AAMPS workpiece 13 (i.e., portion of the AAMPS workpiece 13 that the robotic gripper apparatus 46 grips) is positioned within a space 58 formed by the legs 56a, 56b and the back wall 56c when the AAMPS workpiece 13 is disposed on the platform locking fixture 16.

The clamping assembly 52 is configured to inhibit movement of the AAMPS workpiece 13 in the longitudinal direction of the platform support structure 50 and the vertical direction. The clamping assembly 52 comprises a stationary clamp 60 and a movable clamp 62. The stationary clamp 60 is fixed to the leg 56a using mechanical fasteners such as bolts, screws, rivets, for example. The movable clamp 62 is movable between a lock position in which the AAMPS workpiece 13 disposed on the platform support structure 50 is inhibited from moving in the longitudinal direction and the vertical direction, and an unlocked position in which the AAMPS workpiece 13 disposed on the platform support structure 50 is allowed to move in the longitudinal direction and the vertical direction. An actuator 64 is connected to the movable clamp 62 and is configured to automatically move the movable clamp 62 between the lock position and the unlocked position. That is, the actuator 64 is operable in a first mode in which the movable clamp 62 is in the lock position and a second mode in which the movable clamp 62 is in the unlocked position. In the example illustrated, the actuator 64 is a pneumatic actuator. In another example, the actuator 64 may be any other suitable actuator that can automatically move the movable clamp 62 between the lock and unlocked positions. A bracket assembly 66 supports the actuator 64 and secures the actuator 64 to the base 20.

With reference to FIG. 4, the robot controller 18 is in communication with the cleaning station 42, the robot arms 14a, 14b, and the actuators 34, 64, and may monitor and control operations of the robot arms 14a, 14b and the actuators 34, 64 based on data received. In one example, the robot controller 18 is in communication with the cleaning station 42, the robot arms 14a, 14b, and the actuators 34, 64 using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

Figure 5:
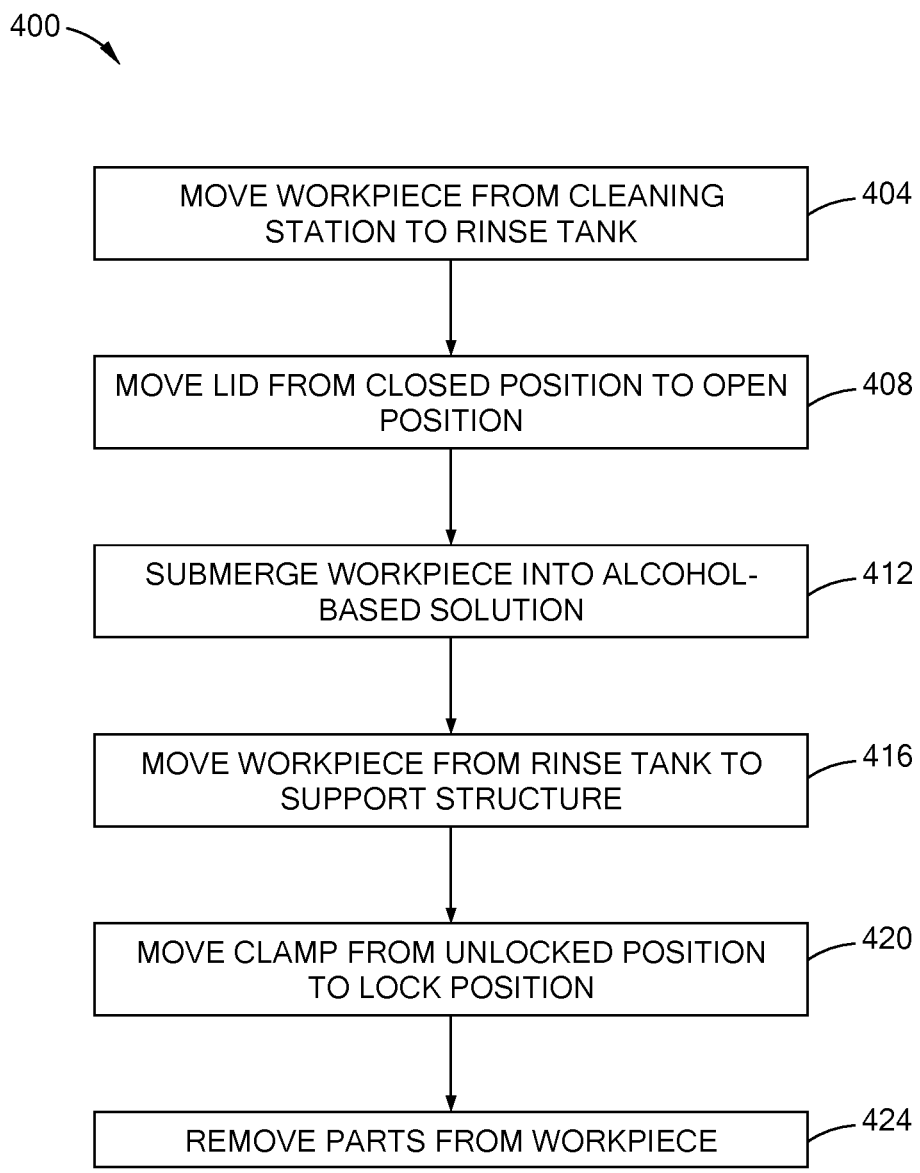
FIG. 5 is a flowchart depicting an algorithm for processing one or more additively manufactured components in accordance with the teachings of the present disclosure.

Referring to FIG. 5, an example control algorithm 400 for processing one or more additively manufactured components 11 by the post-processing system 10 is illustrated. The processing may begin once the cleaning station 42 completes a washing cycle on the additively manufactured components 11, for example. At 404, the control algorithm, using the robot controller 18, instructs the robot arm 14a to move the AAMPS workpiece 13 from the cleaning station 42 to the rinse tank 12 based on the controller 18 receiving a signal from a control module 70 of the cleaning station 42 that the washing cycle is complete. At 408, the control algorithm, using the robot controller 18, instructs the actuator 34 to move the lid 32 from the closed position to the open position in response to the AAMPS workpiece 13 being moved from the cleaning station 42 to the rinse tank 12.

At 412, the control algorithm, using the robot controller 18, instructs the robot arm 14a to submerge the AAMPS workpiece 13 into the alcohol-based solution for a predetermined time period. In one example, the predetermined time period is 30 seconds. The AAMPS workpiece 13 is agitated while in the alcohol-based solution for the predetermined time period. At 416, the control algorithm, using the robot controller 18, instructs the robot arm 14a to move the AAMPS workpiece 13 from the rinse tank 12 to the platform support structure 50 of the platform locking fixture 16 in response to the AAMPS workpiece 13 being in the alcohol-based solution for the predetermined time period. Once the AAMPS workpiece 13 has been removed from the rinse tank 12, the robot controller 18 instructs the actuator 34 to move the lid 32 from the open position to the closed position.

At 420, the control algorithm, using the robot controller 18, instructs the actuator 64 to move the movable clamp 62 from the unlocked position to the lock position in response to the AAMPS workpiece 13 being disposed on the platform support structure 50. At 424, the control algorithm, using the robot controller 18, instructs the robot arm 14b to remove the additively manufactured components 11 from the AAMPS workpiece 13 one by one and place the components 11 onto a plate or platter to be baked and cured. In one example, a sensor such a position sensor, for example, is associated with the platform support structure 50 or the bracket assembly 66, and sends a signal to the robot controller 18 in response to the movable clamp 62 being moved from the unlocked position to the lock position.

The post-processing system 10 of the present disclosure improves the efficiency of the additive manufacturing environment by selectively and collaboratively facilitating the various components without operator intervention.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An additive manufacturing post-processing system comprising:
    a rinse tank;
    at least one robot arm configured to engage and move an automated additive manufacturing production system (AAMPS) workpiece;
    a platform locking fixture including a platform support structure and a clamping assembly; and
    a controller in communication with a workstation, the at least one robot arm and the platform locking fixture, the controller configured to:
        (i) instruct the at least one robot arm to move the AAMPS workpiece from the workstation to the rinse tank based on data received;
        (ii) instruct the at least one robot arm to move the AAMPS workpiece from the rinse tank to the platform support structure based on the data received; and
        (iii) instruct the clamping assembly to secure the AAMPS workpiece onto the platform support structure after the AAMPS workpiece has been moved to the platform support structure,
    wherein the rinse tank, the at least one robot arm and the platform locking fixture are secured to a robot that is configured to move based on location data from one or more sensors.

2. The system of claim 1, wherein the rinse tank, the at least one robot arm and the platform locking fixture are secured to a body on the robot.

3. The system of claim 1, wherein the rinse tank further comprises:
    a container;
    a lid connected to the container and movable between an open position and a closed position; and
    an actuator;
    wherein the actuator is connected to the lid and configured to move the lid between the open position and closed position.

4. The system of claim 3, wherein the controller is in communication with the actuator and configured to instruct the actuator to move the lid from the closed position to the open position in response to the AAMPS workpiece being moved from the workstation to the rinse tank.

5. The system of claim 3, wherein the actuator is a pneumatic cylinder.

6. The system of claim 1, wherein the clamping assembly of the platform locking fixture comprises a stationary clamp and a movable clamp, the movable clamp movable between a lock position in which the AAMPS workpiece is inhibited from moving and an unlocked position in which the AAMPS workpiece is allowed to move.

7. The system of claim 6, further comprising an actuator connected to the movable clamp and configured to move the movable clamp between the lock position and the unlocked position.

8. The system of claim 7, wherein the actuator is a pneumatic actuator.

9. The system of claim 7, wherein the controller is in communication with the actuator and configured to instruct the actuator to move the movable clamp from the unlocked position to the lock position in response to the AAMPS workpiece being moved to the platform support structure.

10. The system of claim 1, wherein the rinse tank, the at least one robot arm and the platform locking fixture are adjacent to each other.

11. An additive manufacturing post-processing system comprising:
    a rinse tank;
    at least one robot arm configured to engage and move an automated additive manufacturing production system (AAMPS) workpiece;
    a platform locking fixture including a platform support structure and a clamping assembly; and
    a controller in communication with a workstation, the at least one robot arm and the platform locking fixture, the controller configured to:
        (i) instruct the at least one robot arm to move the AAMPS workpiece from the workstation to the rinse tank based on data received;
        (ii) instruct the at least one robot arm to move the AAMPS workpiece from the rinse tank to the platform support structure based on the data received;
        (iii) instruct the clamping assembly to secure the AAMPS workpiece onto the platform support structure after the AAMPS workpiece has been moved to the platform support structure; and (iv) instruct the at least one robot arm to remove additively manufactured parts from the AAMPS workpiece after the AAMPS workpiece has been secured to the platform support structure, wherein the rinse tank, the at least one robot arm and the platform locking fixture are secured to a robot that is configured to move based on location data from one or more sensors.

12. The system of claim 11, wherein the at least one robot arm comprises a first robot arm configured move the AAMPS workpiece from the workstation to the rinse tank and from the rinse tank to the platform support structure, and a second robot arm configured to remove additively manufactured parts from the AAMPS workpiece.

13. The system of claim 12, wherein the rinse tank, the first and second robot arms and the platform locking fixture are secured to a base on the robot.

14. The system of claim 11, wherein the rinse tank further comprises:
a container;
a lid connected to the container and movable between an open position and a closed position; and
an actuator;
wherein the actuator is connected to the lid and configured to move the lid between the open position and closed position.

15. The system of claim 14, wherein the controller is in communication with the actuator and configured to instruct the actuator to move the lid from the closed position to the open position in response to the AAMPS workpiece being moved from the workstation to the rinse tank.

16. The system of claim 14, wherein the actuator is a pneumatic cylinder.

17. The system of claim 11, wherein the clamping assembly of the platform locking fixture comprises a stationary clamp and a movable clamp, the movable clamp movable between a lock position in which the AAMPS workpiece is inhibited from moving relative to the platform support structure and an unlocked position in which the AAMPS workpiece is allowed to move relative to the platform support structure.

18. The system of claim 17, further comprising an actuator connected to the movable clamp and configured to move the movable clamp between the lock position and the unlocked position.

19. The system of claim 18, wherein the controller is in communication with the actuator and configured to instruct the actuator to move the movable clamp from the unlocked position to the lock position in response to the AAMPS workpiece being moved to the platform support structure.

20. An additive manufacturing post-processing system comprising:
a rinse tank;
a first robot arm configured to engage and move an automated additive manufacturing production system (AAMPS) workpiece;
a second robot arm configured to engage the AAMPS workpiece;
a platform locking fixture including a platform support structure and a clamping assembly; and
a controller in communication with a workstation, the first and second robot arms and the platform locking fixture, the controller configured to:
(i) instruct the first robot arm to move the AAMPS workpiece from the workstation to the rinse tank based on data received;
(ii) instruct the first robot arm to move the AAMPS workpiece from the rinse tank to the platform support structure based on the data received;
(iii) instruct the clamping assembly to secure the AAMPS workpiece onto the platform support structure after the AAMPS workpiece has been moved to the platform support structure; and
(iv) instruct the second robot arm to remove additively manufactured parts from the AAMPS workpiece after the AAMPS workpiece has been secured to the platform support structure,
wherein the rinse tank, the first and second robot arms and the platform locking fixture are secured to a robot that is configured to move based on location data from one or more sensors.

* * * * *